United States Patent

Plummer

[11] 4,111,561

[45] Sep. 5, 1978

[54] DEFOCUSED UNICELL PHOTOMETER WITH DIFFUSION ZONE

[75] Inventor: William T. Plummer, Concord, Mass.

[73] Assignee: Polaroid Corporation, Cambridge, Mass.

[21] Appl. No.: 763,931

[22] Filed: Jan. 31, 1977

[51] Int. Cl.² .............................. G01J 1/42; H01J 3/14
[52] U.S. Cl. ................................. 356/225; 250/237 R
[58] Field of Search ............... 356/218, 221, 224, 225; 354/23 R, 42, 49; 250/237 R, 239

[56] References Cited

U.S. PATENT DOCUMENTS

| 3,162,766 | 12/1964 | Ploke | 356/225 |
| 3,880,528 | 4/1975 | Petersen | 356/225 |
| 4,040,751 | 8/1977 | Baker et al. | 356/225 |

Primary Examiner—John K. Corbin
Assistant Examiner—Rolf Hille
Attorney, Agent, or Firm—Edward S. Roman

[57] ABSTRACT

A defocused unicell photometer of the type having a positive lens element is provided with at least one diffusion zone on a portion of the lens element surface to change the directional response characteristic of the photometer in a select manner without increasing the extreme field of view of the photometer.

6 Claims, 9 Drawing Figures

DEFOCUSED UNICELL PHOTOMETER WITH DIFFUSION ZONE

BACKGROUND OF THE INVENTION

1. Field of the Invention

This invention relates generally to a defocused unicell photometer with diffusion zone and, more particularly, to a defocused unicell photometer with diffusion zone for providing select directional response characteristics without increasing extreme field of view.

2. Background of the Prior Art

The use of unicell photometers for evaluating scene light to predict and/or control photographic exposures is well known. Such photometers generally consist of a photoresponsive transducer and a lens element for receiving actinic radiation from a scene and directing it onto a photosensitive surface of the transducer. The transducer may be either of the photovoltaic or photoresistive type and provides an output signal indicative of the actinic radiation incident to its photosensitive surface. The output signal from the transducer may thereafter be utilized to predict a photographic exposure condition or to actually control the closing of an automatic shutter blade mechanism at the appropriate film exposure condition. The output signal from such photometers is directionally responsive to the influence of actinic radiation from various scene objects within its field of view as based on their angular field position. Thus, brightly reflective scene objects which are located substantially on-axes with respect to the optical axis of the photometer contribute to a significantly greater portion of the output signal from the photometer than identical objects substantially displaced off the optical axis of the photometer. Since the directional response characteristic of most photometers is inherently so heavily weighted in favor of brightly reflective scene objects located substantially on-axis with respect to the optical axis of the photometer, it becomes generally desirable to suppress the on-axis response of the photometer while simultaneously increasing its off-axis response to provide a directional response substantially less sensitive to the position of a brightly reflective photographic subject in the field of view of the photometer.

One approach to suppressing the directional response of a photometer is utilized in Polaroid Corporation's SX-70 Land Camera which includes a photometer for controlling an automatic exposure control system as are more fully described in U.S. Pat. No. 3,810,201 entitled, "Automatic Return Mechanism for Manually Adjustable Trim Assembly" by E. H. Land et al., issued May 7, 1974 and U.S. Pat. No. 3,820,128 entitled "Flash Photographic Control System" by John Burgerella et al., issued June 25, 1974. The photometer embodied in Polaroid's current SX-70 Land Camera comprises a forward lens element for directing incident actinic radiation to a photoresponsive transducer. In addition, there is also included a series of V shaped light diffusing grooves on one surface of the lens element which grooves operate to tailor the directional response curve for the photometer in a desired manner while simultaneously increasing the field of view of the photometer. However, while this increase in the field of view is perfectly acceptable for the SX-70 Land Camera, there may be instances where it is desirable to specifically tailor the directional response curve for the photometer without increasing the extreme field of view for the photometer.

Therefore, it is a primary object of this invention to provide an improved defocused unicell photometer wherein the directional response of the photometer is specifically biased in a particular direction within the photometer's field of view.

It is another object of this invention to provide and improved defocused unicell photometer wherein the directional response curve for the photometer is suppressed with respect to on-axis actinic radiation incident thereto while being simultaneously broadened with respect to incident off-axis actinic radiation incident thereto without any change in the extreme field of view of the photometer.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A defocused unicell photometer of the type suitable for use in photographic apparatus comprises a photosensitive transducer having a photosensitive surface thereon of predetermined dimension. The transducer operates to provide an output response which varies in correspondence to the intensity of actinic radiation incident to its photosensitive surface. A positive lens element of predetermined focal length is concentrically disposed about an optical axis which ultimately intersects the photosensitive surface. The lens element is also spaced apart from the photosensitive surface by a distance different from the lens focal length. The positive lens element in cooperation with the photosensitive surface of the transducer define a field of view for the photometer such that the lens element operates to direct actinic radiation incident thereon from the field of view towards the photosensitive surface of the transducer. The lens element additionally has at least one light diffusing zone disposed on only a portion of the surface of the lens element for scattering that portion of actinic radiation which directly impinges on the zone from the field of view at angles which would otherwise be refracted onto a path directed toward the center of the transducer to reduce the intensity of that particular portion of radiation which ultimately impinges on the photosensitive surface from the zone. In this manner, a corresponding suppression is effected in that portion of the output response from the transducer which is directly attributable to that particular portion of actinic radiation which would otherwise be refracted onto a path directed toward the center of the transducer. In addition, means are provided for stationing the transducer and lens element in substantially lighttight spaced apart relation with respect to each other.

In one preferred embodiment, the diffusion zone is concentrically disposed with respect to the optical axis for scattering that portion of actinic radiation which directly impinges on the zone from the field of view in directions generally on the optical axis to reduce the intensity of the on-axis portion of actinic radiation which ultimately impinges on the photosensitive surface from the zone. In this manner, there is affected a corresponding suppression in that portion of the output response from the transducer which is directly attributable to the on-axis portion of actinic radiation. The lens element and diffusion zone additionally cooperate to direct that other portion of actinic radiation which directly impinges on the lens element from the field of view in a direction substantially off the optical axis to increase the intensity of the other off-axis portion of actinic radiation which ultimately impinges on the photosensitive surface from the lens element. In this manner, there is effected a corresponding increase in that portion of the output response from the transducer which is directly attributable to the other, off-axis portion of actinic radiation.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein like numbers have been employed in the different figures to denote the same parts and wherein:

DESCRIPTION OF THE PREFERRED EMBODIMENT

Figure 1:
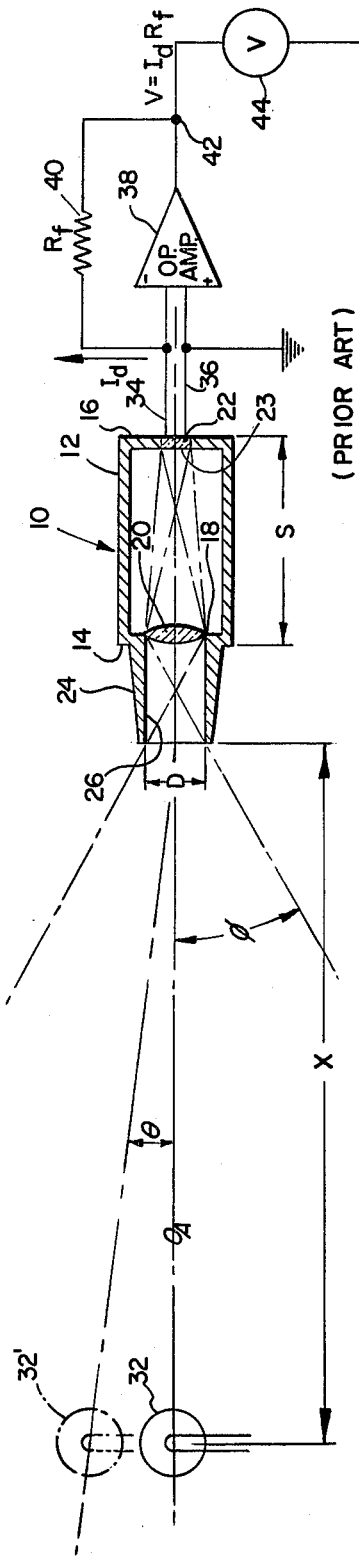
FIG. 1 is a cross-sectional view of a conventional photometer in combination with appropriate circuitry as schematically illustrated for measuring the output response of the photometer.

The directional response of a conventional photometer may be measured in the following manner. Referring now to FIG. 1 there is shown an arrangement through which the directional response for a simple unicell photometer 10 may be measured in a manner as is well known in the art. The photometer 10 is symmetrical about its optical axis so as to provide a rotationally symmetrical directional response. The photometer 10 includes a housing section 12 having forward and rear walls 14 and 16 respectively. The forward wall 14 has an aperture 18 in which is centered a positive, double convex lens 20 for receiving actinic radiation and directing it towards a photosensitive transducer 22 located along the optical axis $O_A$ and centered in the rear wall 16. The lens 20 is spaced apart from the photosensitive transducer 22 by a distance S which is greater than the focal length of the lens 20 thereby placing the photometer 10 in a class of unicell photometers which are generally referred to as "defocused."

The photosensitive transducer 22 may be either of the photovoltaic or photoresistive type although the following description will be hereinafter limited to a transducer of the photovoltaic type. The photovoltaic transducer 22 thus responds to the impingement of actinic radiation on its photosensitive surface 23 by providing a current $I_d$, which is proportional to the intensity of the actinic radiation incident to its photosensitive surface. In addition, the photovoltaic transducer 22 preferably provides a uniform response over its surface such that the electrical response per unit area of the photosensitive surface to a unit of incident flux remains constant regardless of position on the surface.

The lens 20 in combination with the photovoltaic transducer 22 cooperatively define a field of view for the photometer 20, which field of view may be diagrammatically illustrated by the semifield angle $\phi$. The size of the field of view depends upon the focal length of the lens 20, the separation distance S between the lens 20 and transducer 22, the focal length of the lens 20, and the size of the photosensitive surface 23 of the photodetector 22.

Concentric to the lens 20 and extending outwardly from the forward wall 14, there is provided a cylindrical flarehood as shown generally at 24. The flarehood 24 operates to preclude stray or indirect radiation emanating from outside the field of view from entering the interior of the housing 12. The interior of the flarehood 24 defines a cylindrical surface 26 of diameter D which extends longitudinally through the flarehood 24. The diameter D is a sufficient dimension so that the flarehood 24 does not interfere with the field of view. In addition, the interior of the housing 12 may be provided with any well known materials for absorbing any stray radiation not blocked by the flarehood 24.

The data required to calculate the directional response of the photometer 10 is obtained by first placing a constant intensity light source at some distance X forward of the photometer and on the optical axis $O_A$, and then measuring the variation in the electrical response of the transducer 22 as the light source 32 is moved within the field of view of the photometer 10 to different angular locations along a plane perpendicular to the optical axis $O_A$. The size of the light source 32 is chosen so that the angle subtended by the source is substantially small in comparison to the semifield angle $\phi$ of the photometer. The intensity of the light source 32 is selected so that the minimum intensity of actinic radiation incident to the transducer 22 always remains above its minimum level of detectivity. In addition, the remainder of the field of view is maintained dark in order to insure that the output of the transducer 22 is due solely to the actinic radiation received from the light source 32 and not from any other potential background illumination.

Figure 2:
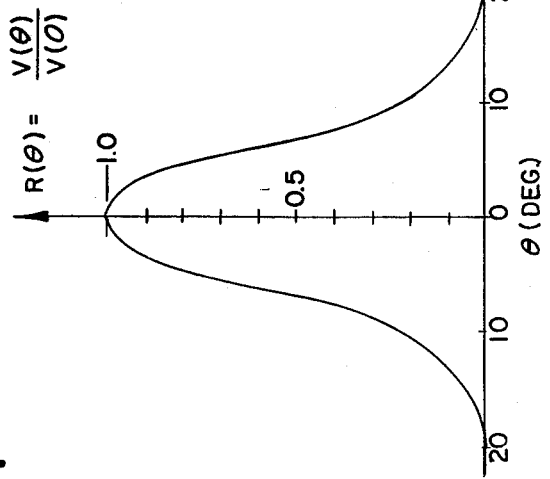
FIG. 2 is a graphical representation for the directional response curve of the photometer of FIG. 1.
Figure 3:
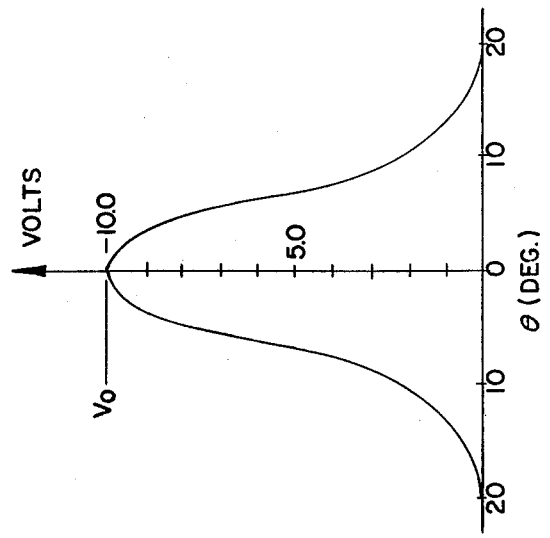
FIG. 3 is a graphical representation of the normalized directional response curve of FIG. 2.

The photovoltaic transducer 22 is provided with a pair of output leads 34 and 36 which respectively connect to an appropriate circuit for measuring the electrical response of the transducer 22. The measuring circuit includes a high gain operational amplifier 38 having a pair of input terminals which connect respectively to the output leads 34 and 36 from the transducer 22. The operational amplifier 38 includes an output lead 42 which connects by way of a feedback resistor 40 to the output lead 34 from the transducer 22. A volt meter 44 may be connected to the output lead 42 to provide a measure of the photovoltaic response from the transducer 22. Thus, as the light source 32 is moved along the plane perpendicular to the optical axis $O_A$ to different angular field locations such as designated at $\theta$, the output voltage from the transducer 22 will vary in accordance with the graph of FIG. 2 to provide the directional response of the photometer 10. Characteristically, the directional response will be in the form of a bell shaped curve having a peak on axis response, $V_O$, which decays to 0 when $\theta$ equals the semifield angle $\phi$. Although the output response from the photovoltaic transducer 22 will change as a function of the intensity of the light source 32, it is readily apparent that this will have no impact on the general shape of the directional response curve for the photometer 10 provided the magnitude of the incident actinic radiation is maintained within the linear response range for the transducer 22. Thus, the graph of FIG. 2 completely characterizes the directional response of the photometer 10 within its range of linear response. The directional response of the photometer 22 as graphically illustrated in FIG. 2 may be normalized as a non-dimensional function for all intensities of illumination of the light source 32 by graphing the ratio of the off-axis voltage response $V(\theta)$ of the transducer 22, to the on-axis voltage response $V_O$ of the transducer 22 as shown in FIG. 2. Thus, the graph of FIG. 2 illustrates a directional response for the photodetector 10 as normalized with respect to the on-axis peak response $V_O$.

Figure 4:
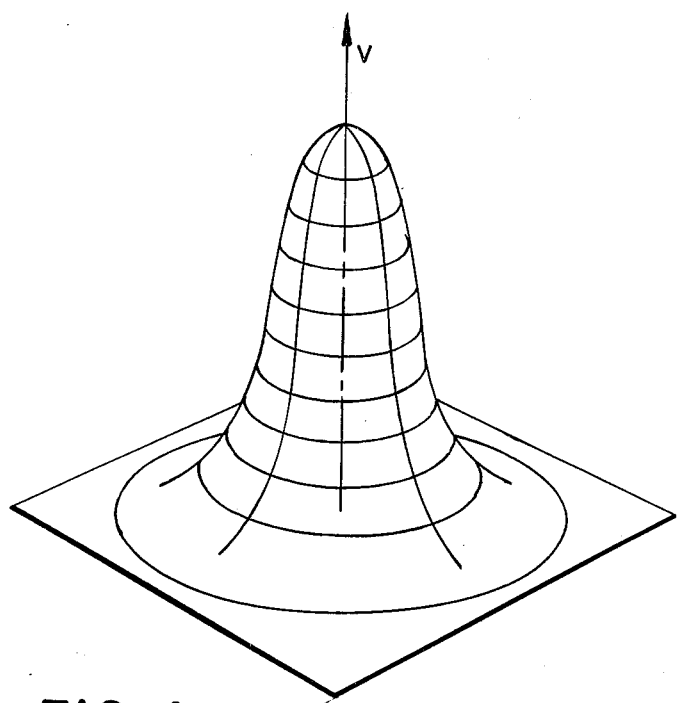
FIG. 4 is a three-dimensional graph of the curve of FIG. 3.

Whereas the geometry of the photometer 10 is rotationally symmetric about its optical axis $O_A$, its directional response is also rotationally symmetric. Thus, a three-dimensional graph may be plotted for the directional response of the photometer 10 as shown in FIG. 4 whereby the volume enveloped by the three-dimensional graph corresponds to the output signal from the transducer for a uniformly backlit or bright scene. The directional response of a photometer may thus be defined as that mathematical function that describes the relationship between the on-axis and off-axis response of a photometer to a light source that occupies a small percentage of an otherwise totally darkened field as the source is positioned at different angular locations in the field.

The directional response of a photometer will therefore provide an indication of what portion of the total output response from the photometer is directly attributable to various objects scattered throughout the field of view. The relative significance of any particular object within the field of view with respect to that portion of the photometer's output response directly attributable to that object is a direct function of that object's angular field position and its luminous intensity.

Figure 5:
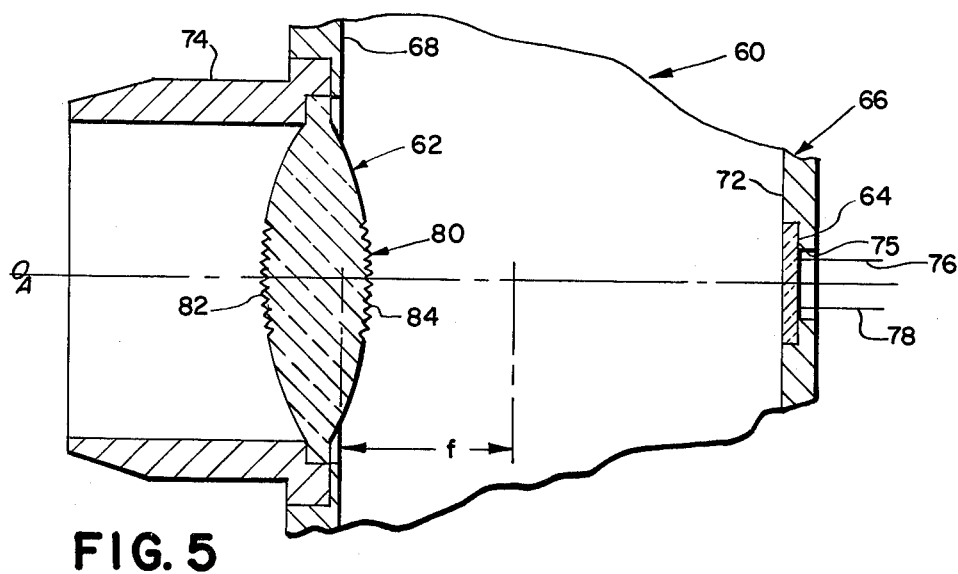
FIG. 5 is a cross-sectional view of the photometer of this invention.

Referring now to FIG. 5 there is shown generally at 60 the defocused unicell photometer of this invention comprising a positive lens element 62 spaced apart from a photoresponsive transducer 64 which is preferably of the photovoltaic type. The lens element 62 preferably has opposed convex surfaces although other types of positive lens elements would also be appropriate too. Means comprising a housing as shown generally at 66 are provided for stationing the transducer 64 and lens element 62 in substantially lighttight spaced apart relation with respect to each other. As previously discussed the focal length of the lens element 62 is shorter than the distance separating the lens element 62 and transducer 64 thus categorizing the photometer 60 as "defocused."

It will be readily understood that the housing 66 may comprise any portion of a camera shutter housing having a front wall member 68 and a rear wall member 72 between which there may be disposed a shutter mechanism (not shown) in a well known manner. The front wall member 68 may include a cylindrical flarehood 74 extending outwardly therefrom to exclude stray or indirect radiation from outside the field of view from entering the interior of the housing 66. Again, the field of view is defined by the combined arrangement of the lens element 62 and the photoresponsive transducer 64 and is preferably not limited by the flarehood 74. The rear wall member 72 may include an opening 75 therethrough to accommodate a pair of output leads 76 and 78 from the transducer 64. The output leads 76 and 78 may extend through the opening 74 to connect to any suitable circuit such as that illustrated in FIG. 1. Light deflecting baffles (not shown) may also be provided in a well known manner between the front and rear wall members 68 and 72 to deflect stray and unwanted actinic radiation.

As previously discussed, the transducer 64 is preferably of the photovoltaic type and, more specificially, may comprise a silicon photodiode which has the advantage of a relatively fast response time, low memory, excellent linearity, together with ready adaptability to convenient shapes and sizes. In addition, silicon tends to be red sensitive, however, this may be easily corrected with appropriate filters. It may be assumed that any red sensitivity associated with the transducer is corrected with appropriate filters (not shown).

Referring now to the lens element 62 there is provided a double convex, positive lens having a diffusion zone as shown generally at 80 concentrically disposed with respect to the optical axis $O_A$ for scattering that portion of the actinic radiation which directly impinges on the zone from the field of view in directions substantially on-axis with respect to the optical axis $O_A$. The diffusion zone 80 which may also be symmetric with respect to the optical axis $O_A$, preferably comprises front and rear lens surfaces 82 and 84 which have been roughened by sand blasting to a distance extending radially outward from the optical axis $O_A$ approximating one sixth of the lens diameter. Thus, as was previously described, the lens element 62 operates to direct actinic radiation incident thereon from the field of view towards the photosensitive surface of the transducer 64. The light diffusing zone 80, in turn, operates to scatter that portion of the actinic radiation which directly impinges thereon from the field of view at angles which would otherwise be refracted into a path directed toward the center of the photosensitive surface of the transducer.

In this manner, the intensity of that portion of the on-axis actinic radiation which ultimately reaches the photosensitive surface of the transducer 64 is reduced. There is thus effected a corresponding suppression in that portion of the output response from the transducer 64 which is directly attributable to that portion of the on-axis actinic radiation. In addition, the lens element 62 and diffusion zone 80 cooperate to direct that other portion of actinic radiation which directly impinges on the lens element 62 from the field of view in directions substantially off-axis with respect to the optical axis in a manner operating to increase the intensity of this off-axis portion of actinic radiation which ultimately impinges on the photosensitive surface from the lens element. In this manner, there is effected a corresponding increase in that portion of the output response from the transducer which is directly attributable to the other off-axis portion of actinic radiation.

Figure 6:
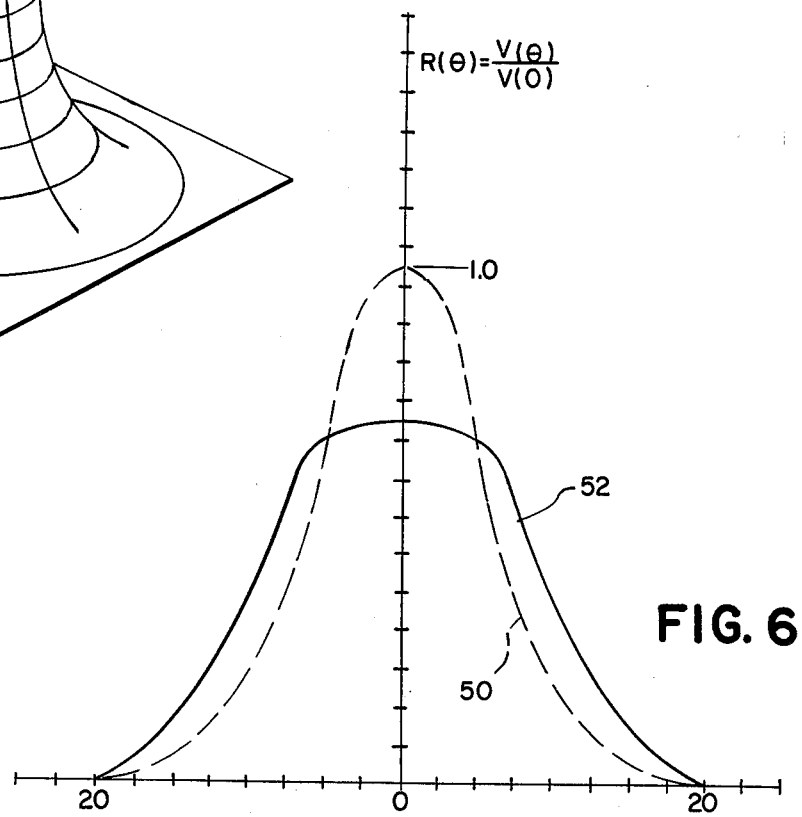
FIG. 6 is a graph of the directional response curve for the photometer of FIG. 5.

Referring now to FIG. 6, there is shown in phantom at 50 the graphical representation for the normalized directional response of the photometer 60 as would occur absent the diffusion zone 80. The solid line graph 52 shows the normalized directional response for the photometer 60 with the above described diffusion zone 80. Thus, a comparison of the two graphs of FIG. 6 illustrates the impact of the diffusion zone 80 on the variable response curve of the photometer 60. The directional response curve 52 for the photometer 60 with the diffusion zone 80 is seen to provide an increase in that portion of the output response from the transducer which is directly attributable to actinic radiation incident from off-axis locations within the field of view while conversely suppressing that portion of the output response of the transducer which is directly attributable to actinic radiation incident from on-axis locations in the field of view. Thus, the directional response curve has been broadened and flattened in the above described manner without increasing the extreme field angle of the photometer. As is now readily apparent, such a change in a directional response curve of the photometer 60 has been accomplished regardless of changes in such other photometer design parameters as cell size, focal length and lens to cell separation distance.

This broadening of the directional response curve for the photometer 60 without effecting a corresponding increase in its field of view is made possible by a redistribution of the actinic radiation from the central diffusion zone 80 towards the edges of the surface of the photoresponsive transducer 64. This redistribution is not so dramatic as to extend beyond the field of view. Thus, the size of the diffusion zone 80 is significant and for the preferred embodiment, the diffusion zone is sized to be substantially equivalent to the size of the image of the photosensitive surface of the transducer 64 as imaged by the lens element 62 in the field of view.

Figure 7:
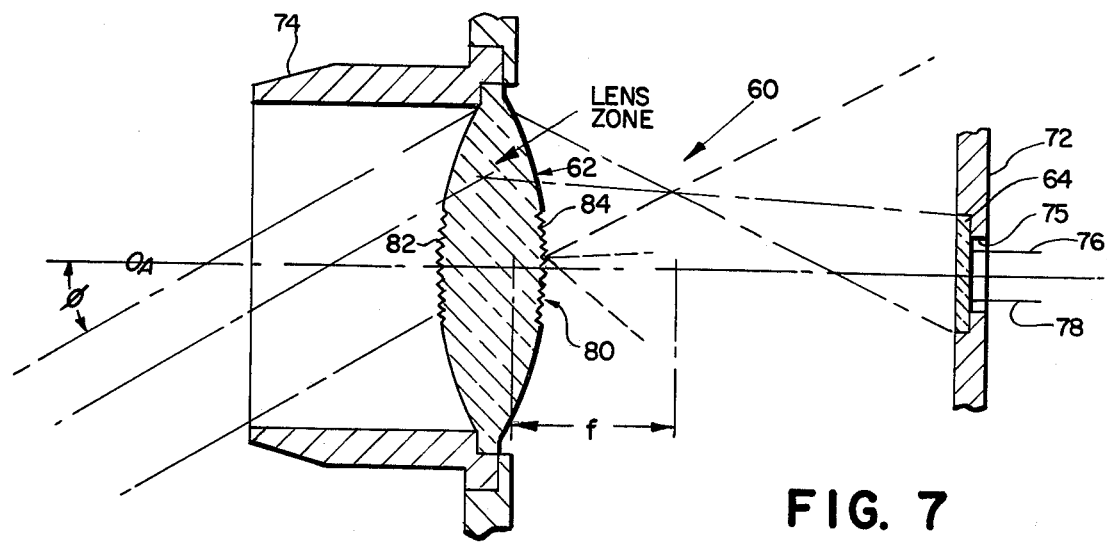
FIG. 7 is a cross-sectional view of the photometer of FIG. 5 illustrating actinic radiation incident at angles approximating the extreme angles of the field.
Figure 8:
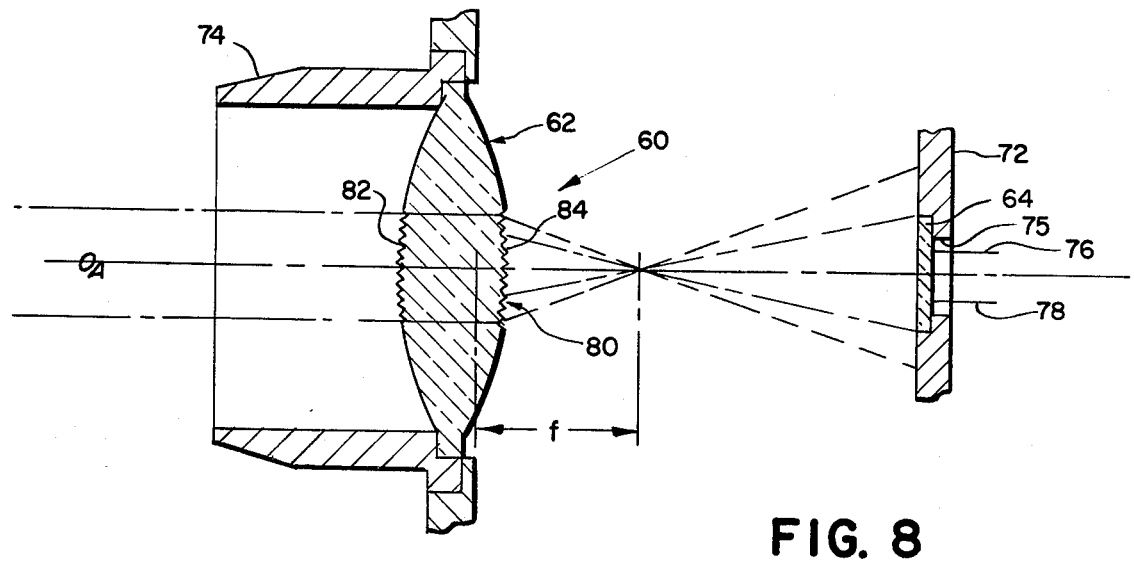
FIG. 8 is a cross-sectional view of the photometer of FIG. 5 illustrating actinic radiation incident thereto at angles substantially on-axis.
Figure 9:
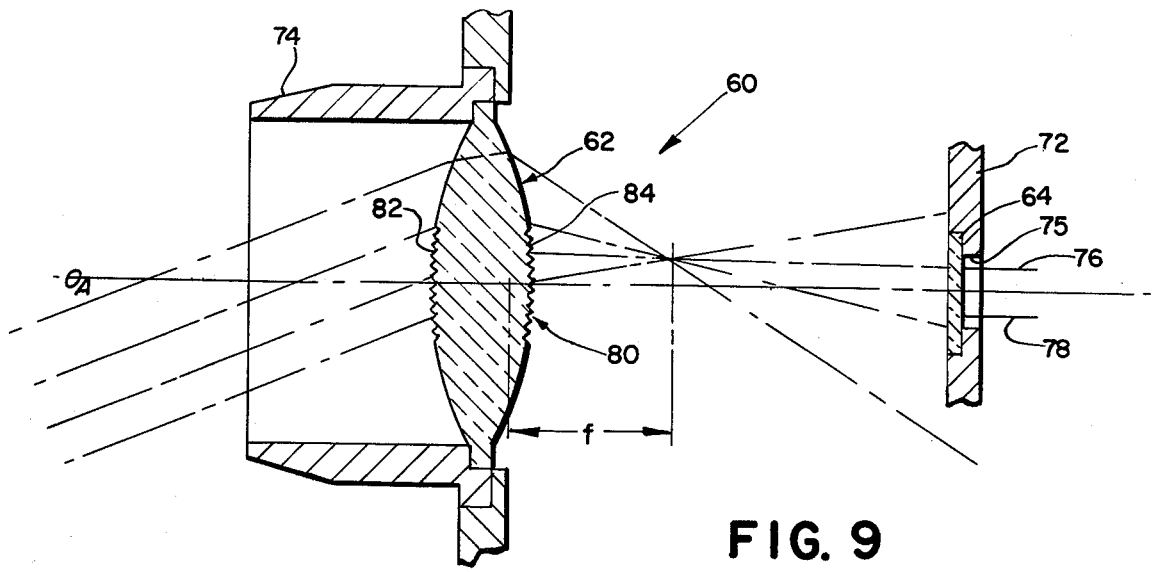
FIG. 9 is a cross-sectional view of the photometer of FIG. 5 illustrating actinic radiation incident thereto at intermediate angles between the optical axis and the extreme edge of the field of view.

Referring now to FIGS. 7 through 9 there is more clearly illustrated the effect of the diffusion zone 80 with respect to the directional response of the photometer 60. FIG. 7 depicts parallel rays from a source of light incident to the lens element 62 at off-axis angles approaching the limit of the semifield angle $\phi$. Thus, it is readily apparent that much of the actinic radiation that reaches the photometer 60 passes through the diffusion zone 80 thereby causing additional radiation which would otherwise be directed away from the photoresponsive transducer 64 to be now directed to the transducer 64 as a result of scattering as it passes through the diffusion zone 80. This accounts for a higher off-axis response than would otherwise be obtained absent the diffusion zone 80. FIG. 8 illustrates the situation where actinic radiation is incident to the photometer 60 from directions primarily on-axis with respect to the optical axis $O_A$. In this situation, some of the incident actinic radiation is scattered beyond the periphery of the transducer 64 so as to suppress the central response as shown by the directional response curve 52 of FIG. 6. FIG. 9 illustrates an intermediate off-axis situation where there may be little or no change effected in the directional response curve of the photometer as graphically illustrated in FIG. 6 by the points of intersection between the phantom line curve 50 and the solid line curve 52.

As previously discussed, photometers of the above described type are characteristically utilized in conjunction with appropriate circuitry to provide an output signal which may be utilized as an indication of a suitable F number and exposure time combination that will deliver an appropriate exposure, or, alternatively, as a control signal to regulate the closing of an automatic shutter. As previously discussed, the photometer 60 provides an output signal directionally responsive to the angular field position of various scene objects within its field of view. Photographic scenes generally include a number of objects or radiant sources scattered throughout a region in space. Thus, the broadened and suppressed directional response curve 52 of FIG. 6 provides an output response for the photodetector that is substantially less sensitive to the locations in which brightly reflecting subjects are located in a photographic scene. However, enough photographic scenes are centered about a brightly reflective subject against a dark background as to make it generally undesirable to provide a non-varying directional response across the entire field of view of the photometer. Thus, the directional response curve 52 of FIG. 6 represents a very satisfactory and suitable compromise for a directional response curve without widening the actual field of view. Again, it will be appreciated that there is no absolute best directional response curve that would have universal photographic application since light distribution patterns will vary greatly between various photographic scenes.

The photometer 60 provides a single electrical output signal across the output leads 76 and 78 which in the case of a uniformly bright or backlit scene is representative of the entire volume enveloped by the directional response curve 52 when rotated about its vertical axis in the manner illustrated by FIG. 4. It will now be understood that the volume enveloped by the phantom line curve 50 when rotated about its vertical axis is substantially the same as the volume enveloped by the braodened curve 52. Thus, there is no overall decrease in the output signal from the photoresponsive transistor 64 resulting from broadening the directional response curve 52 in the aforementioned manner.

Other directional response patterns may be achieved by displacing the diffusion zone off-axis. In this manner the traditional directional response pattern from a conventional unicell photometer as represented by the bell shaped curve of FIG. 6 may be manipulated to be compatible with any photographic scene where the brightest reflective photographic subjects are also off-axis. It will be further appreciated that more than one diffusion zone may be provided on a single lens element. Thus, it is readily apparent that the roughened diffusion zones need not be concentric with respect to the optical axis $O_A$ nor need they be symmetric. It is possible to roughen intermediate areas spaced apart from the optical axis $O_A$, to bias the directional response of the photometer either up or down or left or right.

The local zones chosen for diffusion may be roughened by sand blasting or may be molded in the case of a plastic lens. The amount of light diffusion or scattering will depend on the texture of the diffusion surface which will ultimately determine the direction of the diffused light. In the case of micro-prisms, for example, the direction will obviously be a function of the size and angle of the prisms. Moreover, roughening the entire surface of a lens through diffusion will not result in the desired effect either, but instead will simply suppress the entire directional response curve while also increasing the field of view. The diffusion zones as herein described are only suitable for use in unicell photometers of the defocused type and clearly would not be applicable to a focused unicell photometer.

Since certain changes may be made in the above-described embodiment without departing from the scope of the invention herein involved, it is intended that all matter contained in the above description or shown in the accompanying drawings shall be interpreted as illustrative and not in a limiting sense.

What is claimed is:

1. A defocused unicell photometer for use in photographic apparatus comprising:

a photosensitive transducer having a photosensitive surface thereon of predetermined dimension, said transducer operating to provide an output response which varies in correspondence to the intensity of actinic radiation incident to said photosensitive surface;

a positive lens element of predetermined focal length concentrically disposed about an optical axis which axis ultimately intersects said photosensitive surface, said lens element being spaced apart from said photosensitive surface by a distance different from said lens focal length and cooperating with said photosensitive surface to define a field of view for said photometer such that said lens element operates to direct actinic radiation incident thereon from said field of view towards said photosensitive surface, said lens element additionally having at least one light diffusing zone disposed on only a portion of the surface of said lens element for scattering that portion of actinic radiation, which directly impinges on said zone from said field of view at angles which would otherwise be refracted into a path directed toward the center of said photosensitive surface, to reduce the intensity of said portion of actinic radiation which ultimately impinges on said photosensitive surface from said zone thereby effecting a corresponding suppression in that portion of said output response from said transducer which is directly attributable to said portion of actinic radiation, and means for stationing said transducer and lens element in substantially lighttight, spaced apart relation with respect to each other.

2. The photometer of claim 1 wherein said diffusion zone is concentrically disposed with respect to said optical axis for scattering said portion of actinic radiation which directly impinges on said zone from said field of view in directions generally on said optical axis to reduce the intensity of said on-axis portion of actinic radiation which ultimately impinges on said photosensitive surface from said zone to effect a corresponding suppression in that portion of said output response from said transducer which is directly attributable to said on-axis portion of actinic radiation, said lens element and diffusion zone cooperating to direct that other portion of actinic radiation which directly impinges on said lens element from said field of view in directions substantially off said optical axis to increase the intensity of said other off-axis portion of actinic radiation which ultimately impinges on said photosensitive surface from said lens element to effect a corresponding increase in that portion of said output response from said transducer which is directly attributable to said other off-axis portion of actinic radiation.

3. The photometer of claim 2 wherein said positive lens element includes opposed convex surfaces with said diffusion zone comprising a concentric circular zone on each of said convex surfaces.

4. The photometer of claim 2 wherein said diffusion zone is sized to be substantially equivalent to the size of the image of the photosensitive surface of said transducer as imaged by said lens element in said field of view.

5. The photometer of claim 2 wherein said distance by which said lens element is spaced apart from said photosensitive surface is less than said lens focal length.

6. The photometer of claim 2 wherein said transducer is of the photovoltaic type.

* * * * *